April 27, 1954
F. C. I. MARCHANT
2,676,459
GAS TURBINE ENGINE HAVING A CONTINUOUS OUTER STRESS
BEARING SHELL AND MEANS ALLOWING ACCESS THROUGH
THE SHELL TO THE COMBUSTION SPACE OF THE ENGINE
Filed May 24, 1948
2 Sheets-Sheet 1
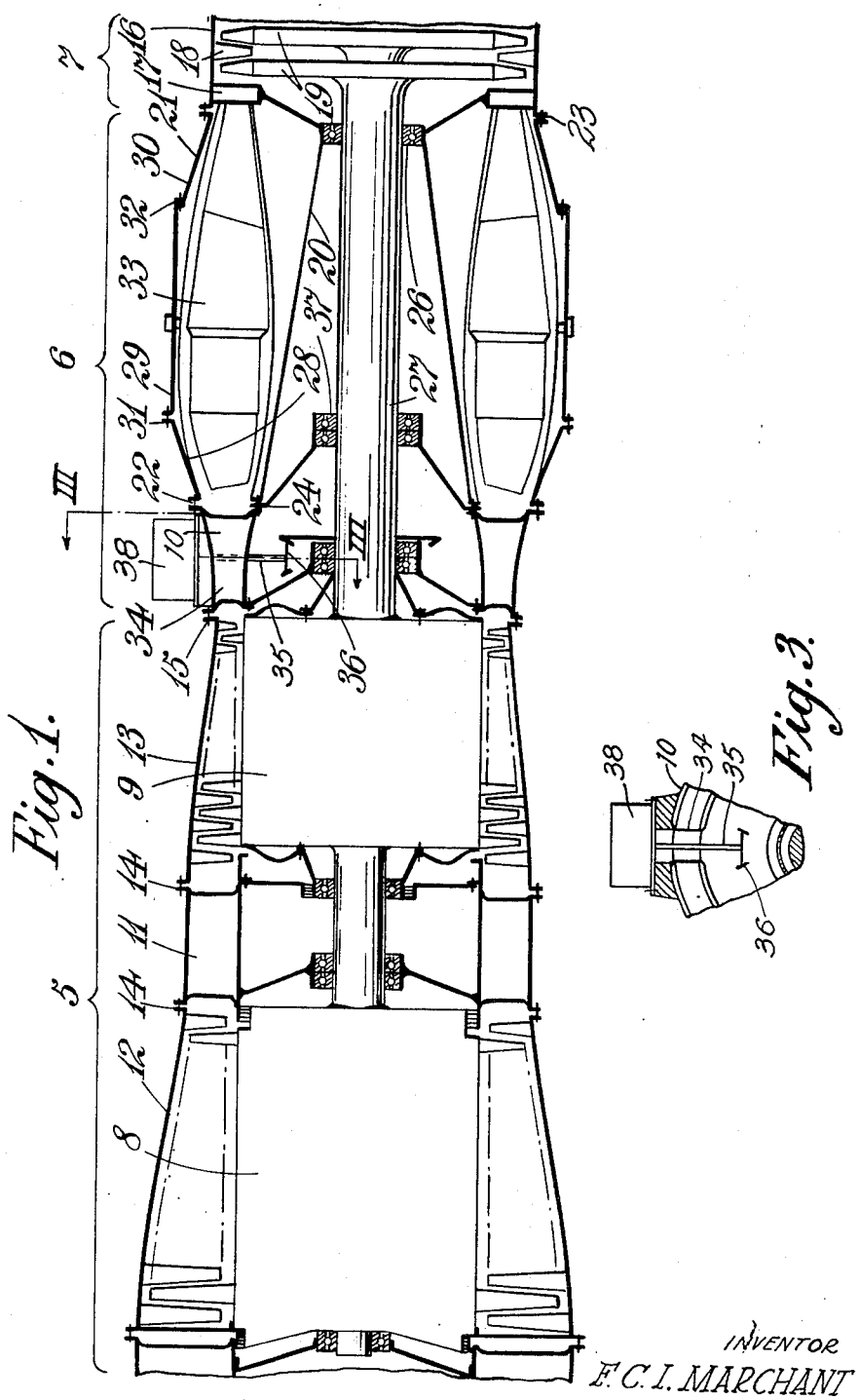
INVENTOR
F. C. I. MARCHANT
by Wilkinson Mawhinney
ATTORNEYS

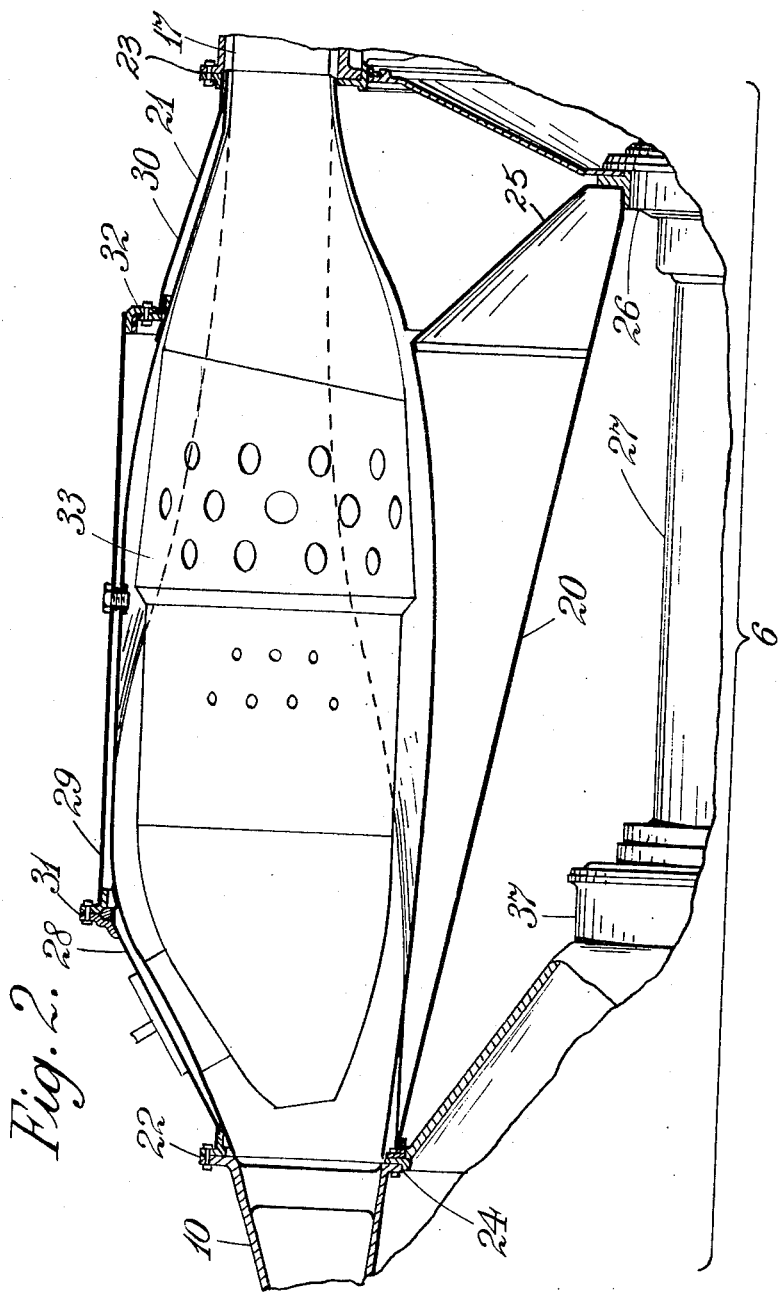

Patented Apr. 27, 1954

2,676,459

UNITED STATES PATENT OFFICE 2,676,459

GAS TURBINE ENGINE HAVING A CONTINUOUS OUTER STRESS BEARING SHELL AND MEANS ALLOWING ACCESS THROUGH THE SHELL TO THE COMBUSTION SPACE OF THE ENGINE

Francis Charles Ivor Marchant, Bristol, England, assignor to The Bristol Aeroplane Company, Limited, Bristol, England, a British company Application May 24, 1948, Serial No. 28,771

Claims priority, application Great Britain June 12, 1947

7 Claims. (Cl. 60—39.31)

This invention concerns gas turbine engines having an annular combustion chamber, that is, a chamber having an inner and an outer wall which extend between the compressor and the turbine. The invention has for its object to provide a construction of engine which is enveloped, substantially over its length, by a stress-bearing shell, part of which is removable to give access to the combustion chamber.

According to this invention a gas turbine engine is provided in which the compressor casing, the outer wall of an annular combustion chamber and the turbine casing form part of a continuous stress-bearing shell enveloping the engine and wherein the inner wall of the combustion chamber forms a further stress-bearing element connecting the compressor and turbine together, the outer wall being removable to give access to the combustion chamber.

A practical application of the present invention will now be described, by way of example, with reference to the accompanying drawings whereof:

Figure 1 is a diagrammatic sectional elevation of a gas turbine engine in accordance with the present invention, Figure 2 is a diagrammatic sectional elevation of the combustion equipment of the engine of Figure 1, and Figure 3 is a detailed sectional view taken on line III—III of Fig. 1.

Referring to Figure 1: the engine comprises a compressor assembly 5, combustion equipment 6 and a gas turbine assembly 7. The assembly 5 delivers air to the combustion equipment 6 which in turn delivers combustion products to the turbine assembly 7. The turbine assembly drives the compressor assembly. The assembly 7 is coaxial with the assembly 5 and is spaced therefrom to accommodate the combustion equipment between them.

The assembly 5 comprises a low-pressure axial-flow compressor 8 and a high-pressure axial-flow compressor 9. The compressor 8 delivers to compressor 9 which in turn delivers into an annular casing 10 leading to the combustion equipment 6. The low-pressure compressor 8 delivers to an annular conduit 11 which connects the two compressors 8 and 9 together.

The compressors 8 and 9 have, in known manner, a stator casing 12 and 13 respectively. The casings 12 and 13 are generally cylindrical and each of them is of sufficiently robust construction to constitute a stress bearing member of the engine. The conduit 11 is bolted, as at 14, to each of casings 12 and 13. Similarly, the annular casing 10 is bolted, as at 15, to the delivery end of the casing 13. The casing 10 and conduit 11 are designed as stress bearing members so that the assembly 5 has a continuous, circular stress-carrying envelope.

The turbine assembly 7, in known manner, comprises an outer ring 16 which encases nozzle guide vanes 17, the stator vanes 18 and the turbine rotors 19 and this casing is sufficiently strong to constitute a stress-bearing member.

The assembly 6 comprises a combustion chamber having an inner and outer wall 20, 21 respectively which are concentric and extend from the casing 10 to the nozzle box of the turbine assembly 7. The wall 21 is bolted, as at 22, to the casing 10 and, as at 23, to the ring 16. The inner wall 20 is bolted, at 24, to the casing 10 and is integrally formed with a diaphragm 25. The inner wall 20 is connected to the casing 10 and, through the vanes 17, to the casing 16. The inner and outer walls 20, 21 of the assembly 6 constitute stress-bearing members.

The wall 21 of the combustion chamber is formed in three parts 28, 29 and 30. The parts 28 and 30 are respectively bolted to the casings 10 and 16. The part 29 is bolted at 31 and 32 respectively to the parts 28 and 30 so that it is removable to give access to the interior of the combustion chamber for inspection and maintenance. When the central part 29 is unbolted it is drawn off towards the right as seen in Figures 1 and 2 and passes over the part 30 and the casing 16 to give access to the interior of the combustion chamber.

Disposed within the annular combustion chamber are a plurality of circumferentially spaced flame tubes 33.

From the above description it will be clear that from the inlet to the assembly 5 to the discharge end of the assembly 7 the engine is surrounded by a continuous, outer shell comprising a casing 12, conduit 11, casings 13 and 10, wall 21 and casing 16. This shell bears the external loads imposed on the engine due to its weight and operating conditions. For instance, if the gas turbine engine is mounted in an aeroplane it will be subjected to loads due to pitching and yawing, acceleration forces and so on and it will be arranged for these to be taken by said shell.

When part 29 of wall 21 is removed for inspection and so on, the external loads on the engine are only those due to its weight and these are then borne by wall 20. The latter also assists in carrying the external loads when the part 29 is in place.

The inner wall 20 carries bearings 26, 37 by which shaft 27 of one of the rotors 19 is supported.

The maximum diameter of the compressor assembly 5 is at the inlet to the compressor 8. This diameter decreases until the casing 10 is reached. The diameter of the annular combustion chamber is at least as great as the maximum diameter of the stator casing. The casing 10 therefore constitutes a waist of the shell which envelopes the engine and advantage is taken of this to accommodate engine and/or aircraft accessories—such as the engine starter, fuel pumps, electric tachometer, oil pumps, vacuum pumps, generators and so on—at the waist. These accessories are attached to the casings 10 and 13 and are designed so as to lie generally within the overall diameter of the engine shell. Suitable drives are taken from the turbines to the various accessories. For instance, the casing 10 is provided with hollow radial arms 34 through one or more of which passes a radial shaft 35 to drive an accessory or accessories e. g. the accessory 38. The shaft 35 is driven through a bevel gear 36 from the shaft 27.

I claim:

1. A gas turbine engine comprising an axial-flow compressor having a tubular, outer casing, a turbine to drive the compressor, the turbine having a tubular, outer casing and combustion equipment comprising an outer tubular wall having a removable portion, an inner tubular wall nested within the outer wall and a plurality of flame tubes in the annular space defined between the walls, means for securing the said compressor casing to the inner and outer walls of the combustion equipment, means for securing the turbine casing to the inner and outer walls of the combustion equipment, the casings and outer wall forming a continuously tubular, stress-bearing shell enclosing the engine and the inner wall forming a support for the casings to which said inner wall is attached, access to the combustion space being obtained on removal of said removable portion of said outer tubular wall, the turbine and compressor casings then being supported by said inner wall and remaining in position.

2. A gas turbine engine as claimed in claim 1 in which the outer wall of the combination chamber is formed in three portions comprising end portions which are secured one to the compressor casing and the other to the turbine casing and a central portion which is secured to the end portions and is removable to give access to the combustion space.

3. A gas turbine engine comprising a compressor having an outer casing, a turbine to drive the compressor, the turbine having an outer casing, combustion equipment including an outer tubular wall, an inner tubular wall nested within the outer tubular wall and a plurality of flame tubes in the annular space defined between the walls, means for securing the compressor casing to the inner and outer walls of the combustion equipment, means for securing the turbine casing to the inner and outer walls of the combustion equipment, the casings and outer wall forming a continuous stress-bearing shell enclosing the engine and the inner wall a support for the casings to which it is attached, said means for securing the outer wall to the compressor and turbine casings permitting removal of said wall to give access to the combustion space, the outer wall of the combustion chamber being formed in three portions including end portions one of which is secured to the compressor casing and the other to the turbine casing and a central portion which is secured to the end portions and is displaceable to give access to the combustion space, the central portion being of greater internal diameter than the overall size of one of the casings and the end portion of the outer wall attached to the said casing and the central portion being displaceable lengthwise of the engine over the said casing.

4. A gas turbine engine as claimed in claim 3 in which the central portion is inwardly flanged at the end next to the turbine and is bolted to an outward flange on the end portion next to the turbine and the central portion is outwardly flanged at its other end which is bolted to an outward flange of the other end portion.

5. A gas turbine engine as claimed in claim 1 in which an annular casing comprising nested inner and outer walls connected together by radial arms, is secured, at one end, to the compressor casing and, at the other end, the inner and outer walls of the annular casing are respectively secured to the inner and outer walls of the combustion equipment, said annular casing forming a waist part of said shell which carries at least one engine accessory around its outer wall, a radial arm being hollow to receive a shaft which drives the engine accessory, said shaft being driven from the turbo-compressor shaft.

6. A gas turbine engine as claimed in claim 1 in which an annular casing, comprising nested inner and outer walls connected together by radial arms, is secured, at one end, to the compressor casing and, at the other end, the inner and outer walls of the annular casing are respectively secured to the inner and outer walls of the combustion equipment, the annular casing forming a waist part of said shell which carries engine accessories around its outer wall and within the overall size of the shell.

7. A gas turbine engine comprising an axial-flow compressor having a tubular, outer casing, a turbine to drive the compressor, the turbine having a tubular, outer casing and combustion equipment comprising an outer tubular wall having a removable portion, an inner tubular wall nested within the outer wall and a plurality of flame tubes in the annular space defined between the walls, means for securing the said compressor casing to the inner and outer walls of the combustion equipment, means for securing the turbine casing to the inner and outer walls of the combustion equipment, the casings and outer wall forming a continuously tubular, stress-bearing shell enclosing the engine and the inner wall forming a support for the casings to which said inner wall is attached, access to the combustion space being obtained on removal of said removable portion of said outer wall, the turbine and compressor casings then being supported by said inner wall and remaining in position and bearing a substantial amount of the stress.

References Cited in the file of this patent

UNITED STATES PATENTS

| Number | Name | Date |
|---|---|---|
| 2,410,450 | Kroon | Nov. 5, 1946 |
| 2,469,439 | Lundquist | May 10, 1949 |
| 2,504,414 | Hawthorne | Apr. 18, 1950 |
| 2,511,432 | Feilden | June 13, 1950 |
| 2,529,958 | Owner | Nov. 14, 1950 |
| 2,531,810 | Fyffe | Nov. 28, 1950 |
| 2,547,619 | Buckland | Apr. 3, 1951 |
| 2,582,848 | Price | Jan. 15, 1952 |
| 2,614,384 | Feilden | Oct. 21, 1952 |

FOREIGN PATENTS

| Number | Country | Date |
|---|---|---|
| 587,527 | Great Britain | Apr. 29, 1947 |
| 588,082 | Great Britain | May 14, 1947 |